(12) United States Patent
Christoff et al.

(10) Patent No.: US 9,643,466 B1
(45) Date of Patent: May 9, 2017

(54) CONTROL OF ADJUSTABLE RIDE HEIGHT SUSPENSION

(71) Applicant: GM GLOBAL TECHNOLOGY OPERATIONS LLC, Detroit, MI (US)

(72) Inventors: Brian D. Christoff, Ann Arbor, MI (US); John K. Dagg, Shelby Township, MI (US); Robert G. Izak, Dryden, MI (US); Christian E. Thomas, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/092,246

(22) Filed: Apr. 6, 2016

(51) Int. Cl.
*B60G 17/015* (2006.01)
*B60G 17/005* (2006.01)

(52) U.S. Cl.
CPC ......... *B60G 17/015* (2013.01); *B60G 17/005* (2013.01); *B60G 2800/914* (2013.01)

(58) Field of Classification Search
CPC . B60G 17/15; B60G 17/005; B60G 2800/914
USPC .......................................................... 701/37
See application file for complete search history.

(56) References Cited

U.S. PATENT DOCUMENTS

| 2007/0265749 | A1* | 11/2007 | Fitzgibbons | ....... B60G 17/0195 701/37 |
| 2009/0033044 | A1* | 2/2009 | Linsmeier | ............ B60G 17/018 280/5.514 |
| 2015/0165860 | A1* | 6/2015 | Soles | ..................... B60G 17/08 280/6.157 |

* cited by examiner

*Primary Examiner* — Yazan Soofi
(74) *Attorney, Agent, or Firm* — Quinn IP Law (57) ABSTRACT

A vehicle includes a suspension corner connecting the vehicle's road wheel to the vehicle's body and characterized by a ride height at the suspension corner. An actuator at the suspension corner is configured to selectively extend and contract in response to a volume of received pressurized fluid to selectively increase and reduce the ride height. The actuator includes a locking device configured to selectively restrain the piston in a predetermined position and release the piston, and includes an actuation mechanism for activating the device to restrain the piston in the predetermined position. A controller is configured to determine if a change in the ride height is required and to assess if the piston is restrained by the locking device. If the piston is restrained by the locking device and the change in ride height is required, the controller releases the piston via the device and then changes the ride height.

20 Claims, 7 Drawing Sheets

CONTROL OF ADJUSTABLE RIDE HEIGHT SUSPENSION

TECHNICAL FIELD

The present disclosure relates to a method of ride height control for an adjustable vehicle suspension.

BACKGROUND

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension system is to maintain the contact between the vehicle's road wheels and the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced operator control, while a suspension for a luxury vehicle may be tuned for the opposite outcome.

The vehicle's intended purpose, along with the specific design of its suspension, also influences the vehicle's ride height, i.e., the set height of the vehicle's body relative to the road surface. In order to accommodate various, and at times conflicting, vehicle objectives, adjustable vehicle ride height suspensions have become more popular.

SUMMARY

A vehicle includes a vehicle body, a road wheel, and a suspension corner connecting the road wheel to the vehicle body, and characterized by a vehicle ride height at the suspension corner. The vehicle also includes an actuator arranged at the suspension corner and configured to receive a pressurized fluid and selectively extend and contract in response to a volume of the pressurized received fluid, to thereby selectively increase and reduce the vehicle ride height at the suspension corner. The actuator includes a locking device configured to selectively restrain the piston in a predetermined position relative to each of the first housing and the second housing and release the piston. The actuator additionally includes an actuation mechanism configured to activate the locking device to thereby restrain the piston in the predetermined position. The vehicle also includes a controller configured to determine if a change in the vehicle ride height at the suspension corner is required and assess if the piston is being restrained by the locking device. The controller is also configured to release the piston via the locking device, if the piston is being restrained by the locking device and the change in the vehicle ride height at the suspension corner is required. The controller is also configured to change the vehicle ride height at the suspension corner after the piston is released by the locking device.

The controller can be additionally configured to monitor the vehicle ride height at the suspension corner. Additionally, the controller can be configured to determine if the change in the vehicle ride height at the suspension corner is required in response to the monitored vehicle ride height.

The controller can be additionally configured to receive a request to change the vehicle ride height at the suspension corner and determine if the change in the vehicle ride height at the suspension corner is required in response to the received request to change the vehicle ride height.

The vehicle can also include a user-interface-based manual switch in operative communication with the controller and configured to communicate the request to change the vehicle ride height at the suspension corner to the controller.

The vehicle can additionally include a sensor configured to detect a road speed of the vehicle and communicate the detected road speed of the vehicle to the controller.

The controller can be additionally configured to generate the request to change the vehicle ride height at the suspension corner automatically in response to the detected road speed of the vehicle.

The vehicle can also include a pump configured to supply the pressurized fluid to the actuator. The controller can be additionally configured to regulate operation of the pump.

The controller can be additionally configured to operate the fluid pump at a target pressure to unload the locking device prior to releasing the piston.

The controller can be additionally configured to increase the vehicle ride height at the suspension corner via activating operation of the pump.

The vehicle can also include a bleed valve in fluid communication with the actuator. The controller can be additionally configured to reduce the vehicle ride height at the suspension corner via opening the bleed valve to release the pressurized fluid from the actuator.

A method of controlling a vehicle ride height at a suspension corner via the actuator discussed above is also disclosed. The method includes determining if a change in the vehicle ride height via the actuator arranged at the suspension corner is required. The method also includes assessing if the piston in the actuator is being restrained by the locking device. The method additionally includes releasing the piston via the locking device, if the piston is being restrained by the locking device and the change in the vehicle ride height at the suspension corner is required. Furthermore, the method includes changing the vehicle ride height at the suspension corner after the piston is released by the locking device.

The above features and advantages, and other features and advantages of the present disclosure, will be readily apparent from the following detailed description of the embodiment(s) and best mode(s) for carrying out the present disclosure when taken in connection with the accompanying drawings and appended claims.

DETAILED DESCRIPTION

Figure 1:
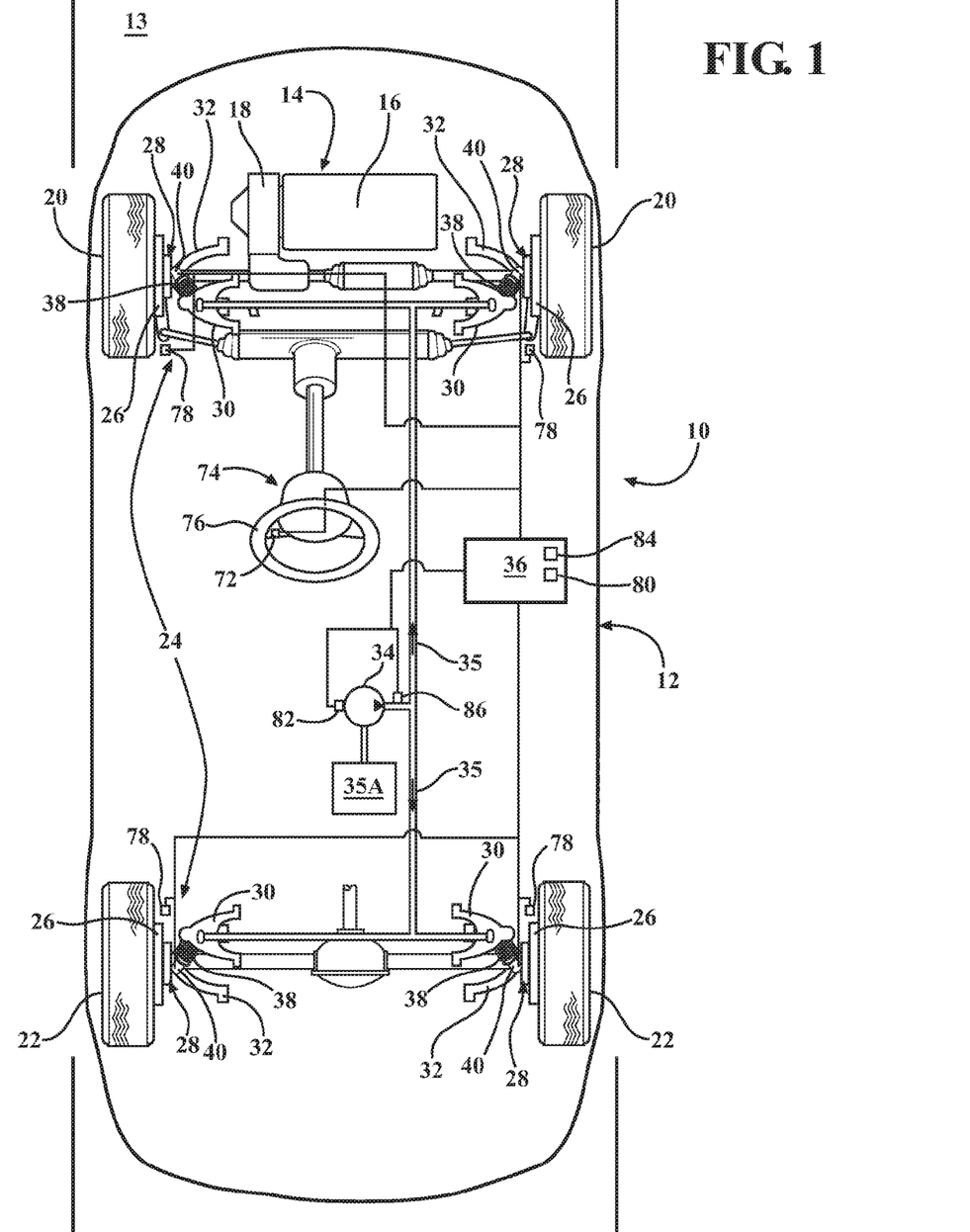
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

Figure 2:
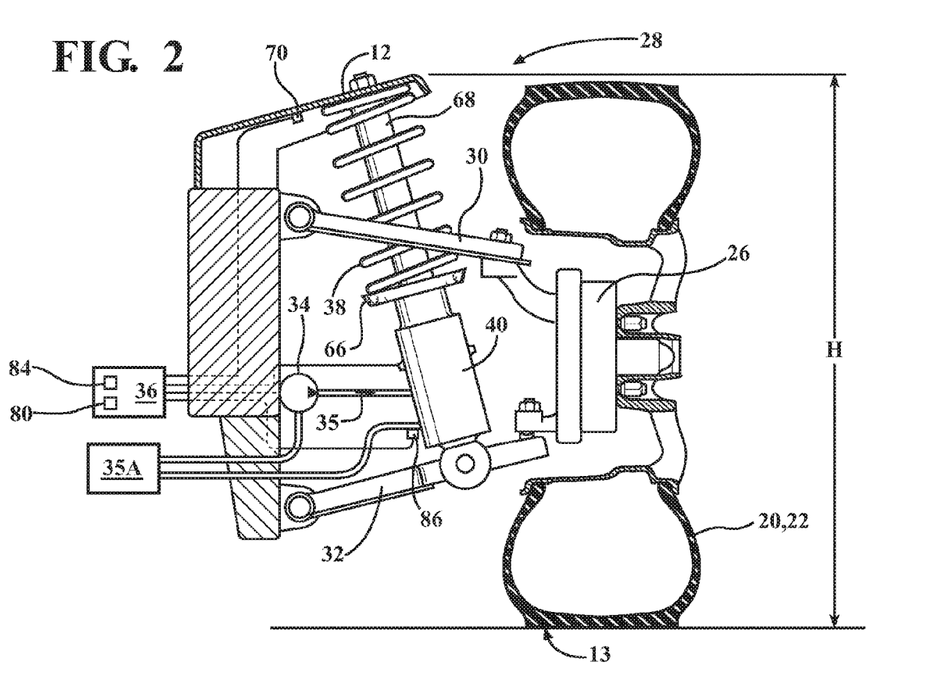
FIG. 2 is an enlarged schematic cross-sectional illustration of a representative suspension corner of the vehicle shown in FIG. 1, having a spring, a damper, and an actuator according to the disclosure.
Figure 3:
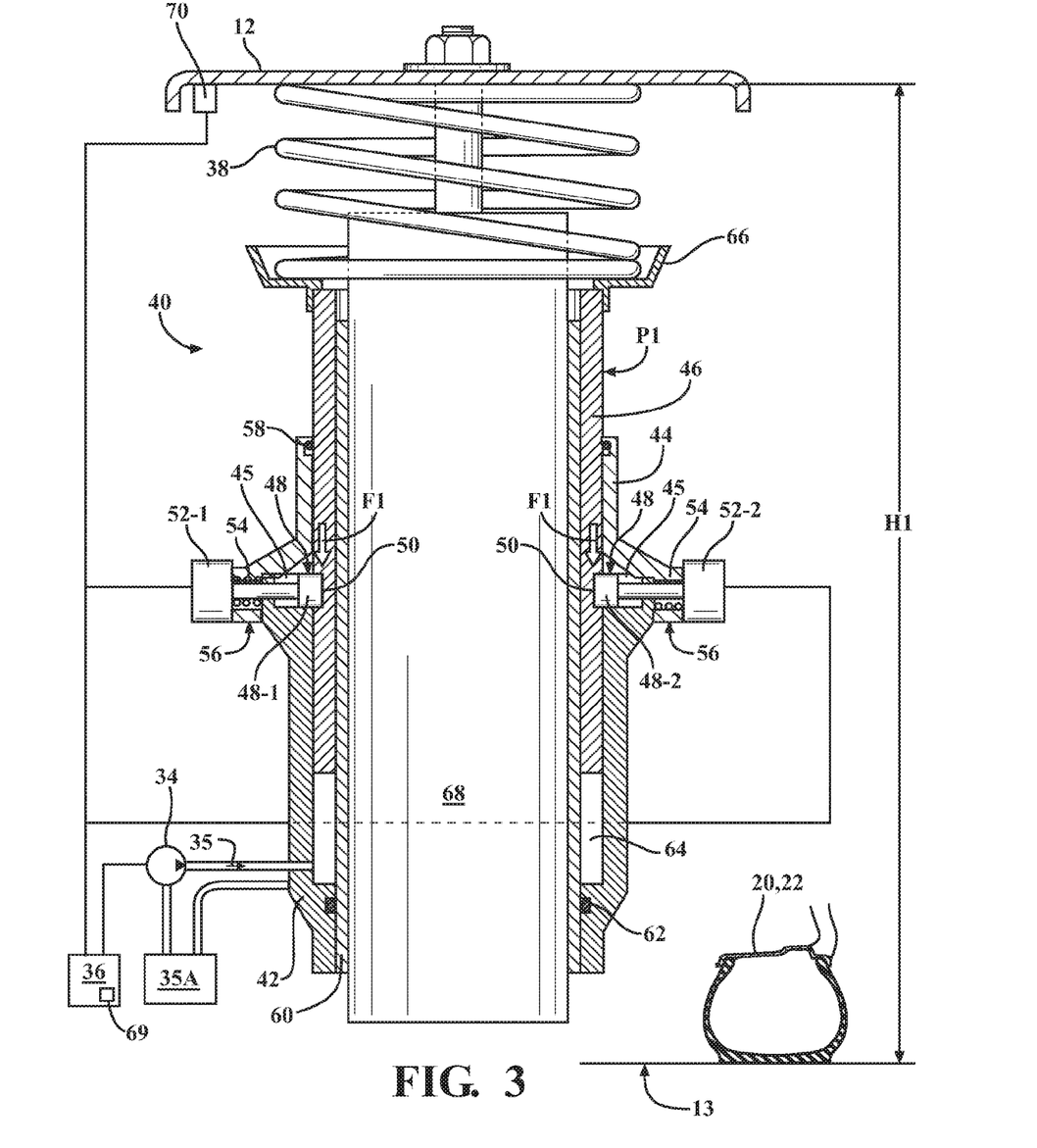
FIG. 3 is a schematic not to scale illustration of the suspension corner shown in FIG. 2, wherein the actuator is shown in a cross-sectional view in an intermediate position and a locked state.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle. The suspension system 24 includes a plurality of knuckles 26, each configured to support a respective road wheel 20, 22 via a wheel hub and bearing assembly (not shown). Each knuckle 26 may be operatively connected to the body 12 via an upper control arm 30 and a lower control arm 32. FIGS. 2-3 depict a representative corner 28 of the suspension system 24, which includes a representative knuckle 26.

As shown in the FIGS. 2-3, at each individual suspension corner 28, the vehicle body 12 is characterized by a specific height H relative to the road surface 13, i.e., vehicle ride height at the respective suspension corner. The suspension system 24 includes a fluid pump 34 configured to supply a pressurized fluid 35 from a reservoir 35A. The fluid pump 34 can be driven via an electric motor (not shown). Additionally, the suspension system 24 includes an electronic controller 36. According to the disclosure, the controller 36 is configured to regulate operation of the pump 34, such as via the electric motor, to vary the vehicle ride height H at the suspension corner(s) 28. For example, the controller 36 can be configured to increase the vehicle ride height H at the suspension corner(s) 28 via activating operation of the pump 34.

The controller 36 may be a vehicle body controller configured to operate other systems of the vehicle 10, such as the braking and stability control systems, which are not specifically shown, but understood by those skilled in the art. Accordingly, the controller 36 is in electrical communication with the fluid pump 34 and various sensors in order to facilitate regulation of the vehicle suspension system 24 in real time, as discussed in detail below. In order to appropriately control operation of the suspension system 24, the controller 36 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 36 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 36 may also include a floppy disk, a flexible disk, hard disk, magnetic tape, any other magnetic medium, a CD-ROM, DVD, any other optical medium, etc. The controller 36 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 36 or accessible thereby may be stored in the memory and automatically executed to provide the required functionality.

Figure 4:
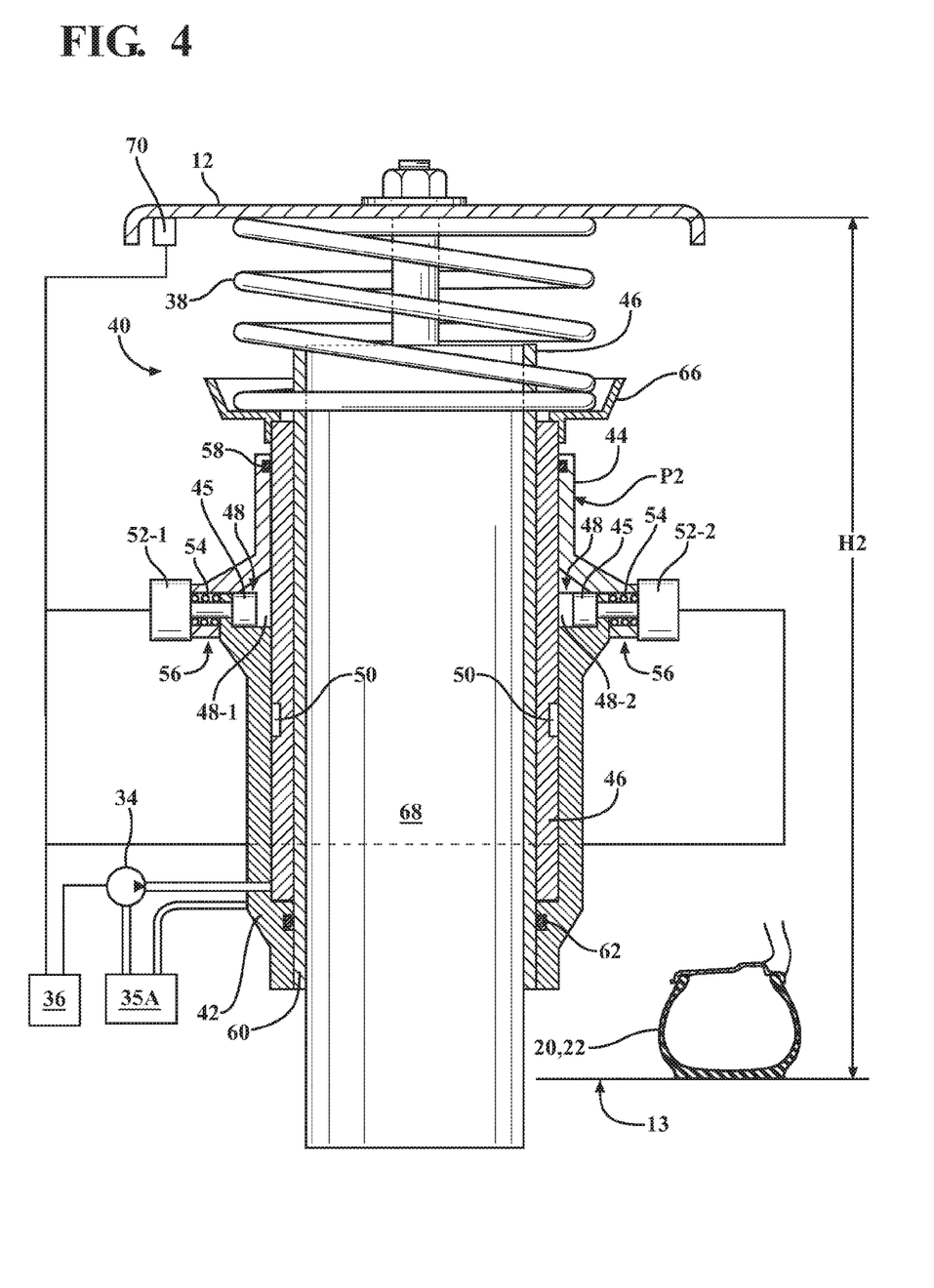
FIG. 4 is a schematic not to scale illustration of the suspension corner shown in FIG. 2, wherein the actuator is shown in a cross-sectional view in a compressed position and an unlocked state.

The suspension system 24 also includes a spring 38, and an actuator 40 connected to each of the front and rear wheels 20, 22, as represented by an individual suspension corner 28 (shown in FIGS. 2-3). Depending on the operating conditions of the vehicle 10, the hydraulic actuator 40 receives pressurized fluid 35 from the pump 34. The knuckle 26 has its motion controlled in response to road input by the spring 38 and a damper 68, which cushion or dampen forces being generated at the wheel 20 or 22 as the vehicle 10 traverses the road surface 13. Although a specific configuration of the suspension system 24 is shown in FIGS. 1-3, other vehicle suspension designs are similarly envisioned, such as another embodiment of the individual suspension corner 28 that is shown in FIG. 4.

The actuator 40 selectively extends and contracts in response to a volume of the pressurized fluid 35 received from the pump 34. As the actuator 40 selectively extends and contracts, such action selectively increases and reduces the height H of the vehicle body 12 relative to the road surface 13 at the suspension corner 28. The actuator 40 includes a first housing 42 and a second housing 44 fixed to the first housing. Although the position of the first and second housings 42, 44 can be reversed, such that in the actual vehicle 10 the first housing 42 is arranged above the second housing 44, hereinafter, and solely for exemplary purposes, the first housing 42 will be referred to as the lower housing and the second housing 44 will be referred to as the upper housing.

Figure 5:
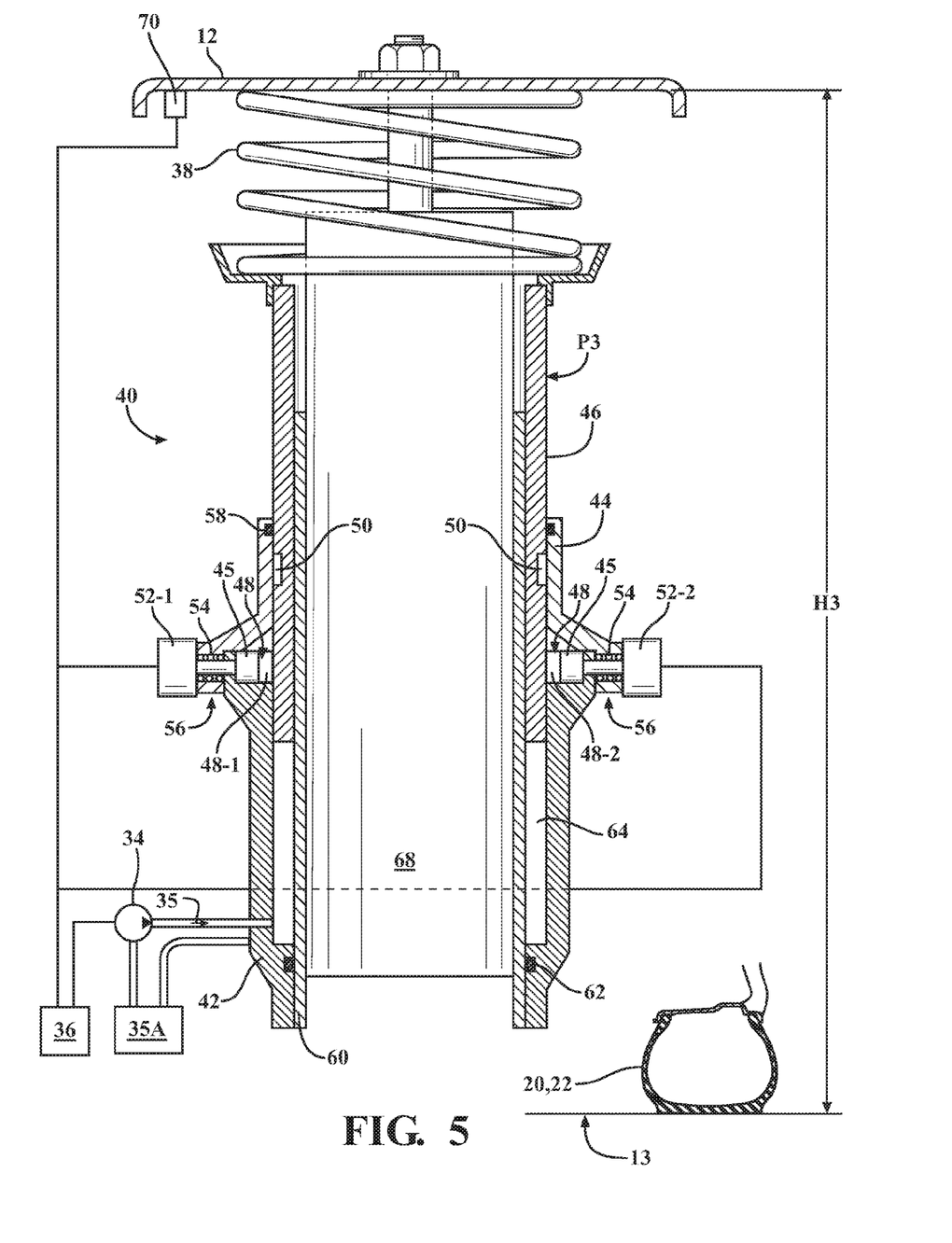
FIG. 5 is a schematic not to scale illustration of the suspension corner shown in FIG. 2, wherein the actuator is shown in a cross-sectional view in an extended position and an unlocked state.

The actuator 40 also includes a piston 46 configured to translate, such as slide relative to each of the lower housing 42 and the upper housing 44. The actuator 40 additionally includes a locking device, generally indicated via numeral 48 and to be discussed in detail below, configured to engage a feature 50, such as a groove or a recess, on the piston 46 and thereby restrain the piston in a predetermined position P1 (shown in FIG. 3) relative to each of the lower housing 42 and upper housing 44. The restraining of the piston 46 in such a predetermined position P1 is intended to set and lock, i.e., mechanically restrain, the predetermined height H of the vehicle body 12 relative to the road surface 13 at the specific suspension corner 28. The locking device 48 is also configured to disengage the feature 50 and release the piston 46 such that the height H of the vehicle body 12 can be varied as desired between minimum design height H2 (shown in FIG. 4) and maximum design height H3 (shown in FIG. 5). The predetermined position P1 of the piston 46 can be an intermediate position between minimum travel P2 (shown in FIG. 4) and maximum travel P3 (shown in FIG. 5) of the piston within a pocket 64. In turn, the predetermined position P1 of the piston 46 sets and defines an intermediate height H1 (shown in FIG. 3) of the vehicle body 12 relative to the road surface 13 at the suspension corner 28. The actuator 40 may have more than a single mechanically-restrained predetermined position P1 between the minimum travel P2 and maximum travel P3 limits. Furthermore, such mechanically restrained predetermined position(s) P1 can be specifically defined at the minimum travel P2 and/or at the maximum travel P3 limits.

The actuator 40 also includes an actuation mechanism 52 configured to activate the locking device 48 and thereby restrain the piston 46 in the predetermined position P1. As shown, the locking device 48 may include a split collar having a first half-collar 48-1 and a second half-collar 48-2, each configured to engage the feature 50 on the piston 46. The actuation mechanism 52 may include a first solenoid 52-1 and a second solenoid 52-2, or any other electric, mechanical, pneumatic, or a hybrid combination device, for example, electro-mechanical, configured to selectively extend the respective first half-collar 48-1 and the second half-collar 48-2 into the feature 50 as part of a control strategy in one embodiment. The selective extension of the respective first half-collar 48-1 and the second half-collar 48-2 into the feature 50, such as by energizing the respective first and second solenoids 52-1, 52-2, restrains or locks the piston 46 in the specific predetermined position P1.

The actuation mechanism 52 may also include at least one elastic element 54, such as a return spring, configured to act counter to the respective forces of the first and second solenoids 52-1, 52-2. Although the elastic elements 54 are depicted as two individual return springs, one per each respective solenoid 52-1, 52-2, a single annular elastic element disposed around the outer circumference of the lower housing 42 and acting simultaneously on each solenoid, is also envisioned. Accordingly, in such an embodiment, the at least one elastic element 54 facilitates retraction of the respective first and second half-collars 48-1, 48-2 from the feature 50, e.g., out of the recess, to thereby release the piston 46 for unhindered movement when the respective first and second solenoids 52-1, 52-2 are de-energized.

Figure 6:
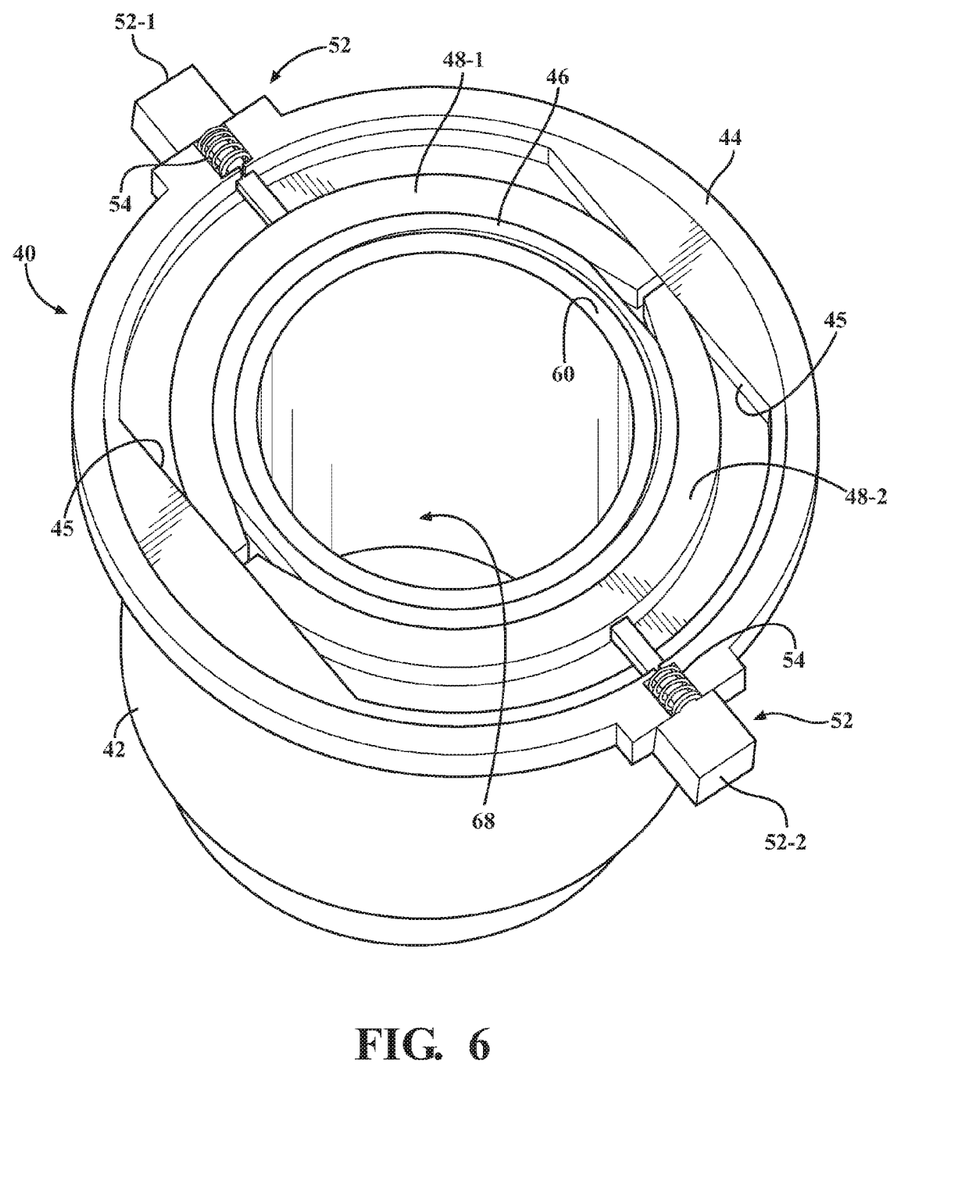
FIG. 6 is a schematic perspective partial illustration of the actuator shown in FIGS. 2-3, depicting an actuator piston being restrained by a locking device.
Figure 7:
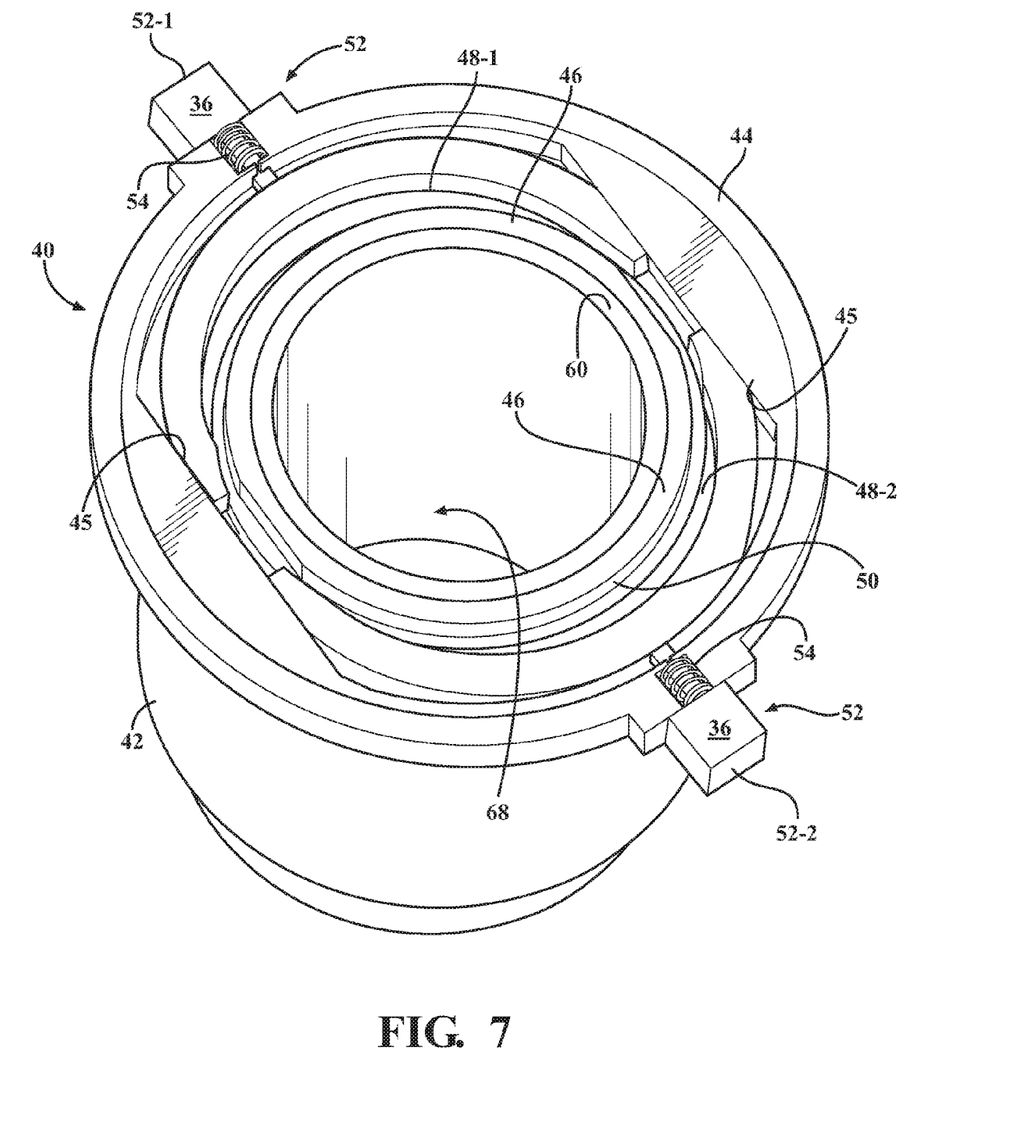
FIG. 7 is a schematic perspective partial illustration of the actuator shown in FIGS. 2-3, depicting the actuator piston being released by the locking device.

An opposite control strategy is also envisioned, where the forces exerted by the at least one elastic element 54 restrain or lock the piston 46 in the specific predetermined position P1. Accordingly, in such an alternative embodiment, the retraction of the respective first and second half-collars 48-1, 48-2 from the feature 50 to release the piston 46 is facilitated by energizing the respective first and second solenoids 52-1, 52-2 counter to locking forces of the respective elastic elements 54. As shown in FIGS. 6 and 7, the half-collars 48-1, 48-2 may be guided for sliding movement relative to the lower housing 42 via dedicated channels 45. The channels 45 may be defined, at least in part, by both the lower and upper housings 42, 44 (shown in FIGS. 3-5), or formed entirely in the lower housing 42 (shown in FIGS. 6-7).

The first solenoid 52-1 and the second solenoid 52-2 may each be mounted on the upper housing 44 of the actuator 40. Additionally, each of the first solenoid 52-1 and the second solenoid 52-2 may extend through the lower housing 42 at an overlapping interface 56 between the lower housing and the upper housing 44. The lower housing 42 can be fixed to the upper housing 44 and sealed at the interface 56 via any appropriate attachment means, such as via welding or complementary spiral threads (not shown). Additionally, the upper housing 44 may include a first sealing element 58 configured to fluidly seal the upper housing 44 to the piston 46.

The actuator 40 may also include a guide sleeve 60 disposed inside the piston 46 and configured to guide the piston during its movement relative to the lower and upper housings 42, 44. The lower housing 42 may include a second sealing element 62 configured to fluidly seal the lower housing to the guide sleeve 60. As shown, the lower housing 42 may include the pocket 64, bounded by the guide sleeve 60 and configured to accept the piston 46 such that the piston is permitted to slide within the pocket. The actuator 40 additionally includes a spring seat 66 configured to provide a reaction surface for the spring 38, while the damper 68 is arranged to extend through the guide sleeve 60. Although the spring seat 66 is illustrated as being arranged on the piston 46, nothing precludes the actuator 40 from being configured such that the spring seat is arranged on the lower housing 42, and the actuator being arranged in the vehicle 10 upside-down to accommodate such an embodiment. The pressurized fluid 35 supplied to the actuator 40 will be delivered into the pocket 64 to selectively expand and contract the volume thereof, thereby selectively increasing and reducing the height H of the vehicle body 12 relative to the road surface 13 at the respective suspension corner 28.

The vehicle 10 may include first sensors 70 configured to detect the height H of the vehicle body 12 relative to the road surface 13 at individual suspension corners 28. As such, the vehicle 10 may include one such first sensor 70 for each suspension corner 28. Specifically, each of the first sensors 70 may be configured to sense proximity of the first sensor 70 to the road surface 13. Furthermore, the controller 36 is configured to receive the signal indicative of the height H of the vehicle body 12 from each first sensor 70 and regulate the actuation mechanism 52 to selectively restrain the piston 46 in the predetermined position P1 and release the piston via the locking device 48, e.g., the split collar with the first and second half-collars 48-1, 48-2. Such restraint of the piston 46 in the predetermined position may be used to set and maintain the vehicle at a specific or default height H as a failsafe mode regardless of operational state of the pump 34.

The controller 36 may be programmed to regulate the actuation mechanism 52, e.g., actuate the first and second solenoids 52-1, 52-2, to thereby either restrain the piston 46 in the predetermined position P1 or release therefrom depending on the selected control strategy, as disclosed above. Accordingly, the suspension system 24 can achieve a mechanically maintained vehicle ride height H without the need to balance the pressure of fluid 35 against the load of the spring 38 and weight of the vehicle body 12. Any of the mechanically maintained predetermined positions P1 for the vehicle ride height H, as discussed above, can be employed as default positions, selectable either manually by an operator of the vehicle 10 or automatically by the controller 36.

To control operation of the vehicle suspension system 24, the controller 36 is programmed to determine if a change in the vehicle ride height H to another, target ride height at any of the individual suspension corners 28 is required, i.e., should be implemented. Whether present vehicle ride height H should be changed to another target ride height at any or all individual suspension corners 28 can depend on the vehicle 10 attaining a predetermined operation, such as the vehicle road speed, and/or the vehicle being operated at specific road conditions, such as standing water, or traversing the road surface 13 with an uneven terrain profile.

The controller 36 is also programmed to assess if the piston 46 is being restrained by the locking device 48. Whether the piston 46 is being restrained by the locking device 48 can be assessed based on whether the controller 36 has previously communicated a signal to activate the locking device 48 to restrain the piston 46 in a particular predetermined position P1. Alternatively, whether the piston 46 is being restrained by the locking device 48 can be assessed using a feedback signal communicated to the controller 36 by each of the first and second solenoids 52-1, 52-2 regarding their position relative to the piston. The controller 36 is also programmed to release the piston 46 via the locking device 48, if the piston is being restrained in position, and the change in the vehicle ride height H at the respective suspension corner 28 is required. To release the piston 46 via the locking device 48, the controller 36 may be programmed to regulate the actuation mechanism 52, e.g., actuate the first and second solenoids 52-1, 52-2, to release the piston 46 from the predetermined position P1, as disclosed above. Accordingly, once the piston 46 has been released, the actuator 40 can accept additional fluid 35 or release some volume of the fluid contained within the pocket 64.

The controller 36 can also be programmed to determine a force F1 being applied to the locking device 48 in the predetermined position P1 prior to the release of the piston 46 via the locking device 48. The determination of the force F1 can be based on an assessment of the load generated by the spring 38 and the weight of the vehicle body 12 opposing the pressure inside the actuator 40 at the subject predetermined position P1, as well as other factors that, for example, affect a load required to retract the first and second half-collars 48-1, 48-2 from the feature 50. The controller 36 can be additionally programmed to set a first target pressure 69 for the fluid pump 34 based on the determined force F1 (shown in FIG. 3). The value of the first target pressure 69 can be specifically selected to unload the locking device 48 for ease of its retraction from the feature 50, i.e., to counteract the load from the spring 38 and the weight of the vehicle body 12, but without loading the locking device hydraulically in an opposite direction. The first target pressure 69 can be determined empirically for various heights H of the vehicle body 12 and programmed into the controller 36 in the form of a look-up table. The first target pressure 69 can also be determined via a computational algorithm to be programmed into the controller 36 and accessed in real time thereby. The fluid pump 34 can be operated via the controller 36 to achieve the first target pressure 69 in order to release the piston 46 via the locking device 48.

Furthermore, the controller 36 is programmed to change the vehicle ride height H at the specific suspension corner 28 after the piston 46 has been released by the locking device 48. Changing the ride height H is accomplished by the controller 36 selectively regulating operation of the fluid pump 34 in real time. Such regulation of the fluid pump 34 can be accomplished via specific voltage or current commands intended to modulate operating speed of the pump for delivering the fluid 35 into the actuator 40. Specific regulation of the fluid pump 34 can depend on the target ride height H, specific road conditions, such as a profile of the road surface 13, i.e., whether the vehicle is traversing uneven terrain, a road speed of the vehicle 10, and the general performance expected from the vehicle by its operator.

The controller 36 can also be configured to monitor the vehicle ride height H at each suspension corner 28, such as via communication with the first sensor(s) 70. The controller 36 can furthermore be configured to determine if the change in the vehicle ride height H at any suspension corner 28 is required in response to the monitored vehicle ride height. Also, the controller 36 can be configured to receive a request to change the vehicle ride height H at the suspension corner(s) 28. Additionally, in response to the received request to change the vehicle ride height H, the controller 36 can be configured to determine if the change in the vehicle ride height is required. The vehicle 10 can also include a user-interface-based manual switch 72 (shown in FIG. 1) in operative communication with the controller 36. The manual switch 72 can be arranged inside a passenger compartment 74 of the vehicle 10, within reach of the operator of the vehicle, such as on a steering wheel 76. The manual switch 72 can be configured to accept the request to change the vehicle ride height H at the suspension corner(s) 28 from the operator of the vehicle and communicate the requested change to the controller 36.

As shown in FIG. 1, the vehicle 10 can additionally include a second sensor 78 configured to detect a road speed of the vehicle and communicate the detected road speed to the controller 36. The controller 36 can be configured to generate a command to change the vehicle ride height H at any suspension corner 28 automatically in response to the detected road speed of the vehicle 10. The programming of the controller 36 can include an algorithm or subroutine to reconcile the request to change the vehicle ride height H with the detected road speed. For example, the controller 36 may deny commanding a vehicle ride height H to be increased if the detected road speed of the vehicle 10 is above a predetermined value 80, such as greater than 50 miles per hour, in order to maintain high speed vehicle handling and maximize vehicle fuel efficiency. On the other hand, the controller 36 may command the vehicle ride height H to be increased if the detected road speed of the vehicle 10 is below the predetermined value, such as during vehicle parking maneuvers. Additionally, the controller may be programmed to automatically release the piston 46 via the locking device 48 and reduce the vehicle ride height H to the minimum travel P2 limit at any or all suspension corners 28 after the vehicle 10 has come to a stop and a park mode has been selected in the transmission 18 to permit passengers of the vehicle to disembark.

The vehicle 10 can also include a pressure switch 82 configured to limit a pressure of the pressurized fluid 35 supplied by the pump fluid 34. The controller 36 can be additionally configured to regulate the pressure switch 82. For example, the pressure switch 82 can be used to set the target pressure 69, discussed above, to unload the locking device 48 and facilitate the release of the piston 46 thereby. Accordingly, the first target pressure 69 or a second target pressure 84 required to achieve a specific ride height H can be set via the pressure switch 82 prior to operating the fluid pump 34. Accordingly, the controller 36 can be configured to increase the vehicle ride height H at the suspension corner(s) 28 via activating the pump 34 to operate at the second target pressure 84. The vehicle 10 can include a bleed valve 86 in fluid communication with the actuator 40. The controller 36 can also be configured to reduce the vehicle ride height H at the suspension corner(s) 28 via opening the bleed valve 86 to release the pressurized fluid 35 from the actuator 40. The suspension system 24 can employ a single, central bleed valve 86 (shown in FIG. 1), or a plurality of individual bleed valves, each associated with a specific actuator 40 (shown in FIG. 2).

Figure 8:
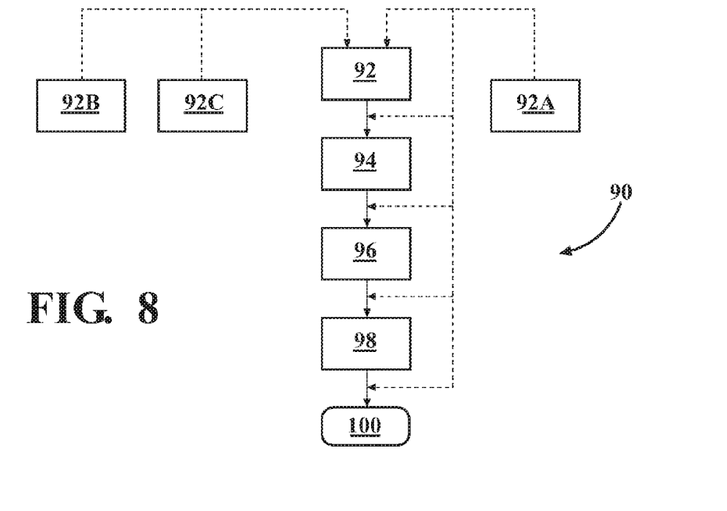
FIG. 8 is a flow diagram of a method for controlling ride height at the suspension corner of the adjustable suspension system depicted in FIGS. 1-7.

FIG. 8 depicts a method 90 of controlling the vehicle ride height H at the suspension corner 28, described above with respect to FIGS. 1-7. The method 90 commences in frame 92 with determining if a change in the vehicle ride height H at a particular suspension corner 28 is required. The method 90 then proceeds from frame 92 to frame 94 where the method includes assessing if the piston 46 is being restrained by the locking device 48. Following frame 94, the method 90 advances to frame 96. In frame 96 the method 90 includes releasing the piston 46 via the locking device 48, if the piston is being restrained by the locking device 48 and the change in the vehicle ride height H at the suspension corner 28 is required. In frame 96 the method 90 may additionally include operating the fluid pump 34 at the target pressure 69 to unload the locking device 48 prior to releasing the piston 46. After frame 96, the method 90 proceeds to frame 98. In frame 98, the method 90 includes changing the vehicle ride height H at the suspension corner 28 after the piston 46 has been released by the locking device 48. Thereafter, method 90 commences at frame 100.

According to the disclosure, either before or following any of the frames 92-98, in frame 92A the method 90 can include monitoring the vehicle ride height H at any and each suspension corner 28, for example via communication between the controller 36 and the first sensor(s) 70. Such monitoring of the vehicle ride height H can, for example, be used to determine if the change in the vehicle ride height H is required. Additionally, before frame 92, in frame 92B the method 90 can also include receiving, via the controller 36, a request to change the vehicle ride height H at any and each suspension corner 28, for example via the user-interface-based manual switch 72. Alternatively, before frame 92, in frame 92C the method 90 can include generating, via the controller 36, the request to change the vehicle ride height H at any and each suspension corner 28 automatically in response to the road speed of the vehicle 10 being detected via the second sensor 78, as discussed above with respect to FIGS. 1-7.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
    a vehicle body, a road wheel, and a suspension corner connecting the road wheel to the vehicle body, and characterized by a vehicle ride height at the suspension corner;
    an actuator arranged at the suspension corner and configured to receive a pressurized fluid and selectively extend and contract in response to a volume of the received pressurized fluid, to thereby selectively increase and reduce the vehicle ride height at the suspension corner, wherein the actuator includes:
        a first housing, a second housing fixed to the first housing, and a piston configured to translate relative to each of the first housing and the second housing;
        a locking device configured to selectively restrain the piston in a predetermined position relative to the first and second housings to thereby lock a predetermined vehicle ride height at the suspension corner, and release the piston; and
        an actuation mechanism configured to activate the locking device to thereby restrain the piston in the predetermined position; and
    a controller configured to:
        determine if a change in the vehicle ride height at the suspension corner is required;
        assess if the piston is being restrained by the locking device;
        release the piston via the locking device, if the piston is being restrained by the locking device and the change in the vehicle ride height at the suspension corner is required; and
        change the vehicle ride height at the suspension corner after the piston is released by the locking device.

2. The vehicle according to claim 1, wherein the controller is additionally configured to monitor the vehicle ride height at the suspension corner, and wherein the controller is configured to determine if the change in the vehicle ride height at the suspension corner is required in response to the monitored vehicle ride height.

3. The vehicle according to claim 1, wherein the controller is additionally configured to receive a request to change the vehicle ride height at the suspension corner and determine if the change in the vehicle ride height at the suspension corner is required in response to the received request to change the vehicle ride height.

4. The vehicle according to claim 3, further comprising a user-interface-based manual switch in operative communication with the controller and configured to communicate the request to change the vehicle ride height at the suspension corner to the controller.

5. The vehicle according to claim 1, further comprising a sensor configured to detect a road speed of the vehicle and communicate the detected road speed of the vehicle to the controller.

6. The vehicle according to claim 5, wherein the controller is additionally configured to generate the request to change the vehicle ride height at the suspension corner automatically in response to the detected road speed of the vehicle.

7. The vehicle according to claim 1, further comprising a pump configured to supply the pressurized fluid to the actuator, wherein the controller is additionally configured to regulate operation of the pump.

8. The vehicle according to claim 7, wherein the controller is additionally configured to operate the fluid pump at a target pressure to unload the locking device prior to releasing the piston.

9. The vehicle according to claim 7, wherein the controller is additionally configured to increase the vehicle ride height at the suspension corner via activating operation of the pump.

10. The vehicle according to claim 1, further comprising a bleed valve in fluid communication with the actuator, wherein the controller is configured to reduce the vehicle ride height at the suspension corner via opening the bleed valve to release the pressurized fluid from the actuator.

11. A method of controlling a vehicle ride height at a suspension corner in a vehicle having a vehicle body and a road wheel, wherein the suspension corner connects the road wheel to the vehicle body, the method comprising:

determining, via a controller, if a change in a vehicle ride height at the suspension corner is required via an actuator arranged at the suspension corner and configured to receive a pressurized fluid and selectively extend and contract in response to a volume of the received pressurized fluid, to thereby selectively increase and reduce a vehicle ride height at the suspension corner, wherein the actuator includes:
  a first housing, a second housing fixed to the first housing, and a piston configured to translate relative to each of the first housing and the second housing;
  a locking device configured to selectively restrain the piston in a predetermined position relative to the first and second housings to thereby lock a predetermined vehicle ride height at the suspension corner, and release the piston; and
  an actuation mechanism configured to activate the locking device to thereby restrain the piston in the predetermined position; and assessing, via the controller, if the piston is being restrained by the locking device;

releasing, via the controller, the piston via the locking device, if the piston is being restrained by the locking device and the change in the vehicle ride height at the suspension corner is required; and changing, via the controller, the vehicle ride height at the suspension corner after the piston is released by the locking device.

12. The method according to claim 11, further comprising monitoring, via the controller, the vehicle ride height at the suspension corner, and wherein said determining if the change in the vehicle ride height at the suspension corner is required is accomplished in response to the monitored vehicle ride height.

13. The method according to claim 11, further comprising receiving, via the controller, a request to change the vehicle ride height at the suspension corner, wherein said determining if the change in the vehicle ride height at the suspension corner is required in response to said receiving the request to change the vehicle ride height.

14. The method according to claim 13, wherein the vehicle additionally includes a user-interface-based manual switch in operative communication with the controller, and wherein the user-interface-based manual switch is configured to communicate the request to change the vehicle ride height at the suspension corner to the controller.

15. The method according to claim 11, wherein the vehicle additionally includes a sensor configured to detect a road speed of the vehicle and communicate the detected road speed of the vehicle to the controller.

16. The method according to claim 15, further comprising generating, via the controller, the request to change the vehicle ride height at the suspension corner automatically in response to the detected road speed of the vehicle.

17. The method according to claim 11, wherein the vehicle additionally includes a pump configured to supply the pressurized fluid to the actuator, further comprising regulating operation of the pump via the controller.

18. The method according to claim 17, further comprising operating, via the controller, the fluid pump at a target pressure to unload the locking device prior to releasing the piston.

19. The method according to claim 17, further comprising increasing, via the controller, the vehicle ride height at the suspension corner via activating operation of the pump.

20. The method according to claim 11, wherein the vehicle additionally includes a bleed valve in fluid communication with the actuator, further comprising reducing, via the controller, the vehicle ride height at the suspension corner via opening the bleed valve to release the pressurized fluid from the actuator.

* * * * *